W. M. DECKER.
MILK BOTTLE AND SIMILAR RECEPTACLE.
APPLICATION FILED OCT. 20, 1916.

1,236,273.

Patented Aug. 7, 1917.

INVENTOR
William Mors Decker,
by Geyer Popp
ATTORNEYS.

UNITED STATES PATENT OFFICE.

WILLIAM MORE DECKER, OF BUFFALO, NEW YORK.

MILK-BOTTLE AND SIMILAR RECEPTACLE.

1,236,273.  Specification of Letters Patent.  Patented Aug. 7, 1917.

Application filed October 20, 1916. Serial No. 126,779.

*To all whom it may concern:*

Be it known that I, WILLIAM MORE DECKER, a citizen of the United States, residing at Buffalo, in the county of Erie and State of New York, have invented new and useful Improvements in Milk-Bottles and Similar Receptacles, of which the following is a specification.

This invention relates to a cap or closure for milk bottles and similar receptacles from which portions of the contents are discharged from time to time and which for sanitary reasons require to be tightly and reliably closed after each use.

The object of my invention is the production of a simple and inexpensive cap of this character which is practically air and liquid tight and dust-proof and which permits convenient discharge of its contents without requiring the removal of the cap for this purpose.

Figure 1:
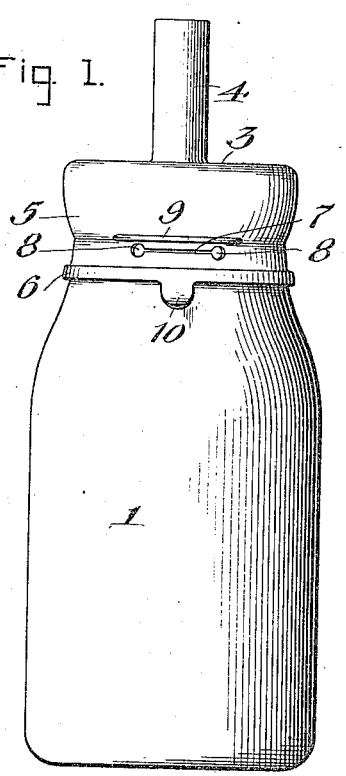
Figure 2:
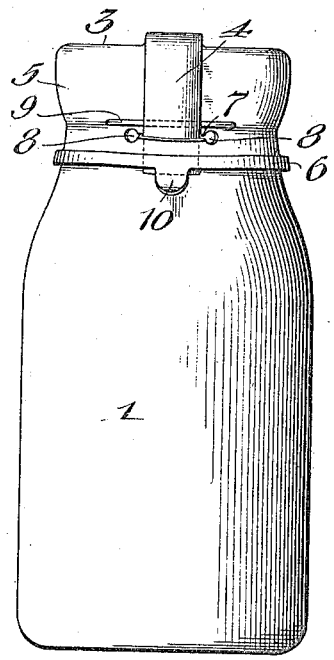
Figure 3:
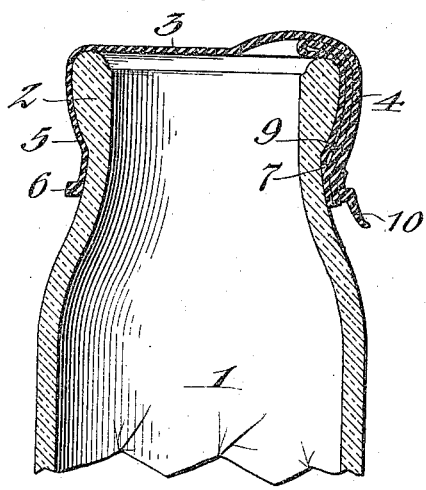
Figure 4:
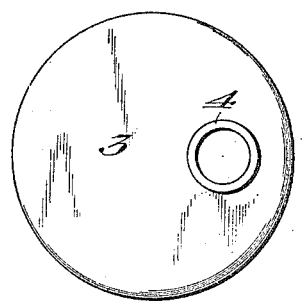

In the accompanying drawings:

Figure 1 is a side elevation of a milk bottle provided with the improved closure, showing the spout in position for use. Fig. 2 is a similar view showing the spout folded and secured in position to close and seal the bottle. Fig. 3 is a vertical section of the upper portion of the bottle and the closure, with the spout folded. Fig. 4 is a top plan view of the closure.

Similar characters of reference indicate corresponding parts throughout the several views.

1 indicates a milk bottle or similar receptacle, usually constructed of glass, and preferably provided at or near its upper end with an external annular bead or enlargement 2.

The improved cap or closure is constructed of soft rubber or other suitable elastic material and comprises an upper portion 3 which extends across the mouth of the receptacle and carries a flexible discharge tube or spout 4, and a depending rim or wall 5 which embraces the bead 2 of the bottle and a portion of its neck. Normally the cap is of somewhat smaller dimensions than the top of the bottle, so that it must be stretched over it. The lower end of the rim 5 may be provided with an annular bead 6 to reinforce it.

The discharge spout 4 is preferably located near one side of the cap and molded in one piece therewith. It is of sufficient length to permit of its being folded down over the top of the cap and against its rim and to extend substantially to the lower edge thereof. Near its lower edge, preferably below the receptacle-bead 2, said rim is provided with a horizontal slit or slot 7 which is adapted to receive the free portion of the folded spout, so as to compress the same between the lower portion of the rim and the bottle neck, thereby reliably confining the spout in that position without the use of additional fastening means of any kind. By this construction, the compressed and constricted spout is closed so tightly as to prevent leakage or escape of its contents as well as the entrance of air and dust.

The slit 7 is preferably somewhat wider than the folded and flattened spout, as shown in Fig. 2, to permit the ready entrance of the spout into the slit, and to further facilitate this operation the slit may be provided at its ends with enlargements 8.

In order to compensate for any weakening of the cap-rim due to the formation of the slit, a horizontal reinforcing bead or rib 9 may be molded on the face of the rim adjacent to the slit, preferably a short distance above it, as shown. This reinforcement, however, is not an essential feature of the invention and may be omitted, if desired.

In the use of the closure, after filling the receptacle at the dairy, it is closed by stretching the elastic cap over it, to the position shown in Fig. 1. The spout 4 is then folded over the side of the cap and tucked into the slit 7 by drawing the portion of the rim below the slit away from the side of the receptacle. To facilitate this action, the adjacent portion of the rim may be provided with a tab or fingerpiece 10. By this fastening, the spout is held down in place with sufficient security to prevent its withdrawal from the slit by the impact or pressure of the bottle-contents against the cap, incident to handling and shipment.

To pour out a part of the contents, the user simply withdraws the folded spout from the slit of the cap, whereupon the spout expands and springs to its normal unfolded position, as shown in Figs. 1 and 4, permitting the milk or other contents to flow freely through it. After discharging the desired quantity, the spout is again folded and tucked in the slit to reseal the receptacle.

The closure itself thus remains undisturbed until the receptacle is empty, avoiding the inconvenience of removing and restoring it, like an ordinary spoutless cap, and not only rendering the receptacle more sanitary as a whole but also saving considerable time.

After the bottle has been emptied, the cap is removed and the parts are cleaned and sterilized. The cap together with its spout can be easily reversed, affording access to all portions of it for thorough cleansing.

As the entire closure can be molded in one piece and involves no separate fastening means for the spout, its construction is exceedingly simple and it can be cheaply produced.

I claim as my invention:

1. A bottle closure, comprising an elastic cap having a depending rim adapted to be stretched over the mouth of the bottle and a flexible spout adapted to be folded against said rim, the latter having a slit arranged to receive and confine the free end of the spout when folded.

2. A bottle closure, comprising an elastic cap having a depending rim adapted to be stretched over the mouth of the bottle, said rim having a slit near its lower edge, and a flexible spout extending from the top of the cap and adapted to fold against said rim and engage said slit.

3. A bottle closure, comprising an elastic cap having a depending rim adapted to embrace the mouth of the bottle, said rim being provided with a slit having enlargements at its ends, and a flexible spout extending from the top of the cap and adapted to fold against said rim and pass through said slit.

4. A bottle closure, comprising an elastic cap having a depending rim adapted to embrace the mouth of the bottle, said rim being provided with a substantially-horizontal slit and adjacent to said slit with a reinforcement, and a flexible spout extending from the top of the cap and adapted to fold against said rim and pass through said slit.

5. A bottle closure, comprising an elastic cap having a depending rim adapted to embrace the mouth of the bottle, said rim being provided with a substantially-horizontal slit and above said slit with a reinforcing rib, and a foldable spout extending from the top of the cap and adapted to enter said slit.

6. In a milk receptacle or the like, the combination with a bottle provided at its top with a bead, of an elastic cap having a depending rim which embraces the beaded top of the bottle and a flexible spout adapted to fold against said rim, the latter being provided below said bottle-bead with a slit arranged to receive the free end of the spout when folded.

WILLIAM MORE DECKER.

Copies of this patent may be obtained for five cents each, by addressing the "Commissioner of Patents, Washington, D. C."